UNITED STATES PATENT OFFICE 2,520,123

POLYGALACTURONIDE ALKYLAMIDES

John F. Carson, Berkeley, Calif., assignor to United States of America as represented by the Secretary of Agriculture No Drawing. Application November 22, 1946, Serial No. 711,761

16 Claims. (Cl. 260—209.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the preparation of polygalacturonide alkylamides.

The neutralization of pectic acids with various amines to yield amine salts is known—Stuewer et al., J. Am. Ph. Assn., vol. 29, p. 303, 1940. However, the conversion of the carbomethoxyl groups of pectins to alkylamide groups has not been hitherto disclosed.

It has now been found that polygalacturonide alkylamides can be prepared in good yield by reacting, at a temperature not exceeding about 50° C. and under anhydrous conditions, a polygalacturonide which is substantially completely esterified as methyl ester with a primary or secondary alkylamine in the liquid phase.

The reaction can be illustrated by the following equation:

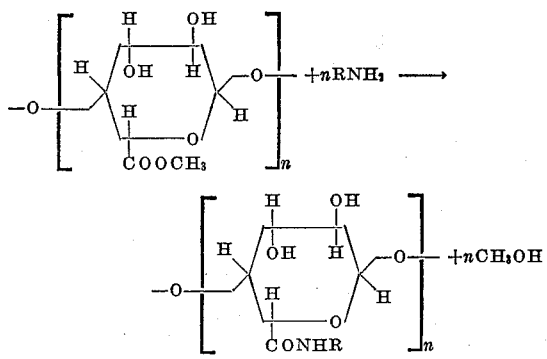

wherein R is an alkyl radical, the radical within the brackets is the anhydrogalacturonic repeating unit of the polygalacturonide, and $n$ is the number of repeating units in the molecule.

It has been found that only carbomethoxyl groups (—COOCH$_3$) enter into the reaction; free carboxyl groups do not. For this reason the starting material should be a polygalacturonide in which substantially all the carboxy groups are methylated. Thus pectic acid is not operative in the process because it is a completely deesterified pectin containing only free carboxyl groups. Pectin operates well in the process as most of the carboxyl groups in pectin are methylated. In order to prepare compounds containing a maximum number of alkylamide groups, it is preferred to start with pectin and first esterify all free carboxyl groups with methanol-hydrogen chloride. The resulting completely esterified polygalacturonide methylester when treated according to the instant process yields a product containing practically no free carboxyl groups and a maximum of alkylamide groups.

An object of this invention is therefore to provide methods for preparing polygalacturonide alkylamides.

Another object of this invention is to provide methods for preparing polygalacturonide alkylamides by reacting a polygalacturonide methylester with an alkyl amine.

Another object of this invention is to provide novel compounds, i. e., polygalacturonide alkylamides.

Other objects will be apparent to those skilled in the art from the description herein.

In order to describe the invention, the following examples are submitted. It is understood that these examples are offered by way of illustration and not limitation.

Example 1

Twenty grams of anhydrous pectin (10.7% methoxyl) was mixed with 90 grams of n-butyl amine. The mixture was allowed to stand for 3 days. Three hundred ml. of dry ether was added to coagulate the product and the mixture centrifuged. The product was washed with ether, ethanol-HCl, 95% ethyl alcohol, and ether. The product, pectin n-butyl amide, was dried in vacuo. Yield 24 grams, methoxyl content 0.5%. Nitrogen content, 4.24%; calculated nitrogen content, 4.23%.

Example 2

(a) A completely esterified polygalacturonide methyl ester was prepared as follows:

Two hundred and fifty grams of pectin was mixed with 2,000 ml. of methanol containing 1% hydrogen chloride. The mixture was stirred under reflux at 64–65 C. for 38 hours, then filtered. The precipitate was washed thoroughly with absolute methanol, 95% ethanol, acetone, and finally ether. Upon drying in vacuo, 249 grams of polygalacturonide methylester was obtained. Methoxyl content, 14.5%.

(b) Five grams of the above polygalacturonide methylester was shaken for several hours with 25 grams of normal hexyl amine. The mixture was allowed to stand for 4 days, then the product recovered by coagulation with 150 ml. of ether and centrifugation. The product was washed with ether, 2% HCl in ethanol, 95% ethanol, and with ether again. Upon drying in vacuo, 6.2 grams of polygalacturonide n-hexyl amide was obtained as a white, odorless powder. Methoxyl content, 1.6%. Nitrogen content, 4.75%; calculated 4.94%.

*Example 3*

Seven grams of polygalacturonide methylester (prepared as set forth in Example 2a) was shaken together with 30 grams of octyl amine. The mixture was allowed to stand for 72 hours and the polygalacturonide octyl amide separated and purified as set forth in Example 2b. The polygalacturonide n-octyl amide was obtained as a white, odorless powder in a yield of 8.9 grams. Methoxyl content, 6.39%. Nitrogen content, 2.74%; calculated 4.50%.

*Example 4*

Eleven grams of polygalacturonide methylester (prepared as set forth in Example 2a) was shaken with 50 grams of normal propyl amine for 3 hours. The mixture was allowed to stand for 72 hours and the product recovered as in Example 2b. Yield of polygalacturonide n-propyl amide, 12.4 grams. Nitrogen content, 5.81%; calculated 5.81%.

*Example 5*

Nine grams of pectin (10.7% methoxyl) was shaken for a few hours with 42 grams of normal propyl amine. The mixture was allowed to stand 4 days and the product precipitated and purified as set forth in Example 1. The pectin n-propyl-amide was found to have a nitrogen content of 4.5% (calculated 4.42%) and a methoxyl content of 0.3%.

*Example 6*

Seven grams of polygalacturonide methylester (prepared as set forth in Example 2a) and 25 grams of ethylamine (anhydrous) were placed in a 125 ml. flask protected from moisture with a calcium sulphate tube. The flask was placed in a solid carbon dioxide-acetone bath and let stand overnight. The excess ethylamine was then removed by placing the flask in a bath of warm water (30° C.). The lumpy residue was stirred with 100 ml. of ether, filtered, and washed with ether, 2% HCl in ethanol, ethanol, and ether. Yield of polygalacturonide ethyl amide, 7.8 grams. Nitrogen content, 6.05%; calculated 6.17%.

*Example 7*

A mixture of 10 grams of polygalacturonide methylester (prepared as set forth in Example 2a) and 70 grams of normal butyl amine was allowed to stand for 4 days. The product was precipitated with ether and purified as set forth in Example 2b. Yield of polygalacturonide n-butyl amide, 12.9 grams. Methoxyl content, 0.5%. Nitrogen content, 5.85%; calculated 5.49%.

The polygalacturonide used in the process should have a methoxyl content of 10% to 16.3%. Thus the ordinary pectin of commerce which has a methoxyl content of 10 to 11% can be used in the process. Further, more completely esterified polygalacturonides having a methoxyl content up to the theoretical maximum of 16.3% can also be used. By the term "polygalacturonide" is meant a compound of the formula:

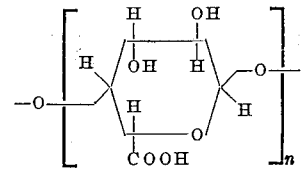

wherein the symbol $n$ represents the number of anhydrogalacturonic acid repeating units. The process is particularly adapted to the preparation of compounds derived from polygalacturonide methylesters of high molecular weight, i. e., above 5,000, such as pectin. These compounds of high molecular weight are exceedingly difficult to react because of their insolubility in organic solvents and/or reagents. For instance, Carson and Maclay (Jour. Am. Chem. Soc., vol. 67, pp. 787–789, 1945) found that in order to acylate pectin, it is first necessary to swell the pectin in pyridine. It is therefore surprising that the instant process is operative and gives high yields by merely mixing the reagents and allowing the mixture to stand. No pre-treatment of the pectin is necessary, and thoroughly dried pectin, a material difficultly soluble in organic solvents, can be used directly in the process.

It was found that the products made by the process herein described have a high molar ratio of alkylamide groups to anhydrogalacturonic repeating units, namely, at least 3 to 4. Thus it was observed that when pectin was amidified, the product had a molar ratio of 3 alkylamide groups to 4 anhydrogalacturonic repeating units. When the completely esterified polygalacturonide was employed, as in Examples 2, 3, etc., it was determined that the product contained a molar ratio of alkylamide groups to anhydrogalacturonic repeating units of substantially 1 to 1.

Many different amines can be used in the process, i. e., any primary or secondary alkylamine, such as methyl amine, ethyl amine, n-propyl amine, isopropyl amine, n-butyl amine, 2-butyl amine, n-hexyl amine, n-octyl amine, dimethyl amine, diethyl amine, dipropyl amine, di-isopropyl amine, etc.

The proportion of polygalacturonide methylester to amine is not critical. Sufficient amine must be used to replace the methoxyl groups by carbamide groups as can easily be determined stoichiometrically. However, it has been found to be advantageous to use a considerable excess of the amine. The excess of amine acts as a solvent or diluent in the reaction and makes for better contact between the reagents. Thus it has been found that from about 3.5 to about 10 parts by weight of amine to each part by weight of polygalacturonide methylester gives good results. The excess of amine can be easily recovered from the reaction mixture by distillation in vacuo, the amine being volatile and the amide product being substantially non-volatile.

The temperature of reaction should be kept low to prevent decomposition of the product or the polygalacturonide methylester. Thus temperatures above 50° C. should be avoided. In most cases room temperature gives good results. If the amine is of especially low boiling point such as methyl or ethyl amine, the reaction mixture should be cooled to keep the amine in the liquid phase.

In the examples, the amide product is separated from the reaction mixture by addition of ether which coagulates the amide product. This type of recovery is not essential. The reaction mixture can be subjected to vacuum distillation to remove excess amine and by-product methanol leaving the amide product as the distillation residue. Further the thorough purification set forth in the examples is not essential if a technically pure product is desired. A washing with ethanol will generally suffice to remove excess amine and drying will complete the purification.

It has been found that the reagents must be anhydrous in order to get good yields. Reflux condensers and other openings in the reaction vessel should be protected with calcium sulphate tubes. If the amine is substantially non-volatile at the reaction temperature, a closed vessel can be used.

The ethyl-, n-propyl-, and n-butyl-amides are soluble in water to give solutions of low viscosity. They are also soluble in formamide, swelled in the lower alcohols and aliphatic amines, and are generally insoluble in organic solvents. The lower alkyl amides, particularly the propyl- and butyl-amides, are somewhat surface-active and produce stable foams. The amides prepared from the completely methylated polygalacturonide are more surface active than the corresponding amides prepared from commercial pectin. The amides are not precipitated from their aqueous solution by calcium ions. This is important if the products are to be used as foaming agents in hard water. It was observed that the amides prepared from pectin could be precipitated from their aqueous solution by copper, nickel, or lead ions. However, the amides with a low free-acid content prepared from the completely methylated polygalacturonide do not possess this characteristic. Thus the propyl- or butylamide, prepared in accordance with Examples 4 and 7, in 0.5% aqueous solution, did not precipitate in the presence of 5% copper or lead nitrate. The higher alkylamides are insoluble in water and organic solvents but are swelled in formamide. The alkyl amides are useful as intermediates in organic syntheses. As above stated, the lower alkyl amides have surface active properties to some extent and may be used as foaming agents and as stabilizers for emulsions.

Having described my invention, I claim:

1. A polygalacturonide propylamide in which the molar ratio of propylamide groups to anhydrogalacturonic repeating units is at least 3 to 4.
2. A polygalacturonide butylamide in which the molar ratio of butylamide groups to anhydrogalacturonic repeating units is at least 3 to 4.
3. A polygalacturonide alkylamide in which the molar ratio of alkylamide groups to anhydrogalacturonic repeating units is at least 3 to 4.
4. A polygalacturonide alkylamide having a molecular weight of at least 5,000 and in which the molar ratio of alkylamide groups to anhydrogalacturonic repeating units is at least 3 to 4.
5. A polygalacturonide alkylamide having a molecular weight of at least 5,000 and in which the molar ratio of alkylamide groups to anhydrogalacturonic repeating units is substantially 1 to 1.
6. A process for preparing a polygalacturonide alkylamide which comprises reacting, at a temperature not exceeding about 50° C. and under anhydrous conditions, a polygalacturonide methylester having a methoxyl content of at least 10% with an alkylamine in the liquid phase, said alkylamine having at least one hydrogen atom attached to the nitrogen atom until there is produced a polygalacturonide alkylamide in which the molar ratio of alkylamide groups to anhydrogalacturonic repeating units is at least 3 to 4.
7. The process of claim 6 wherein the polygalacturonide methylester has a molecular weight of at least 5,000.
8. The process of claim 6 wherein the polygalacturonide methylester has a molecular weight of at least 5,000 and wherein the alkylamine is a primary alkylamine.
9. The process of claim 6 wherein the polygalacturonide methylester has a molecular weight of at least 5,000 and wherein the alkylamine is n-propylamine.
10. The process of claim 6 wherein the polygalacturonide methylester has a molecular weight of at least 5,000 and wherein the alkylamine is n-butylamine.
11. The process of claim 6 wherein the polygalacturonide methylester is pectin.
12. The process of claim 6 wherein the polygalacturonide methylester is pectin, and wherein the alkylamine is n-propylamine.
13. The process of claim 6 wherein the polygalacturonide methylester is pectin, and wherein the alkylamine is n-butylamine.
14. A polygalacturonide ethylamide in which the molar ratio of ethylamide groups to anhydrogalacturonic repeating units is at least 3 to 4.
15. A polygalacturonide hexylamide in which the molar ratio of hexylamide groups to anhydrogalacturonic repeating units is at least 3 to 4.
16. A polygalacturonide octylamide in which the molar ratio of octylamide groups to anhydrogalacturonic repeating units is at least 3 to 4.

JOHN F. CARSON.

REFERENCES CITED

The following references are of record in the file of this patent:

UNITED STATES PATENTS

| Number | Name | Date |
|---|---|---|
| 2,133,273 | Cox | Oct. 18, 1938 |
| 2,380,739 | Evans et al. | July 31, 1945 |
| 2,480,710 | Bryant | Aug. 30, 1949 |

OTHER REFERENCES

Richter's Organic Chemistry, vol. 1, 3rd Eng. Ed. 1944, page 321.